(12) United States Patent
Wainwright et al.

(10) Patent No.: US 8,125,492 B1
(45) Date of Patent: Feb. 28, 2012

(54) PARAMETER WIRING

(75) Inventors: John Wainwright, Los Gatos, CA (US); Michael Malone, Suwanee, GA (US); Frank Delise, Smithtown, NY (US)

(73) Assignee: Autodesk, Inc., San Rafael, CA (US)

( * ) Notice: Subject to any disclaimer, the term of this patent is extended or adjusted under 35 U.S.C. 154(b) by 2113 days.

(21) Appl. No.: 09/953,577

(22) Filed: Sep. 14, 2001

Related U.S. Application Data (60) Provisional application No. 60/291,947, filed on May 18, 2001, provisional application No. 60/293,109, filed on May 22, 2001.

(51) Int. Cl.
 *G09G 5/22* (2006.01)
(52) U.S. Cl. ...................................................... 345/551
(58) Field of Classification Search .................. 345/473, 345/474, 581, 619, 646, 706, 949–960, 651, 345/652, 662, 663, 677, 678, 551, 423, 696
See application file for complete search history.

(56) References Cited

U.S. PATENT DOCUMENTS

| | | | | |
|---|---|---|---|---|
| 5,649,086 | A * | 7/1997 | Belfer et al. | 345/441 |
| 5,727,950 | A * | 3/1998 | Cook et al. | 434/350 |
| 5,854,634 | A * | 12/1998 | Kroitor | 345/473 |
| 6,310,627 | B1 * | 10/2001 | Sakaguchi | 345/630 |
| 6,331,861 | B1 * | 12/2001 | Gever et al. | 345/629 |
| 6,714,201 | B1 * | 3/2004 | Grinstein et al. | 345/474 |

OTHER PUBLICATIONS

"Hyperwire Concept What Hyperwire Does", by Kinetix, a division of Autodesk, Inc. © 1997 Autodesk, Inc. (pp. 1-3) www.gfa-videotechnik.de/homehype.htm.
"Kinetix, a division of Autodesk Inc.: Hyperwire", by Greg Alwang, PC Magazine, dated May 14, 1998 (pp. 1-2) www.zdnet.com/filters/printerfriendly/0,6061,311730-3,00.html.
Maya 4™ entitled "The first choice for digital content creators producing world-class 3D animation & visual effects", includes Maya Builder™, Maya Complete™ and Maya Unlimited™, (8 pgs) Brochure from Alias|wavefront of Toronto, Ontario, Canada available from www.aliaswavefront.com.
"Houdini Overview", by sidefx, dated Dec. 10, 2001, (pp. 1-2) www.sidefx.com/houdini/overview.shtml.
"Houdini Features", by sidefx, dated Dec. 10, 2001, (pp. 1-6) www.sidefx.com/houdini/features.shtml.
"Houdini Brochure", Side Effects Software, (6 pgs) www.sidefx.com/houdini/hbf.pdf.
PTC—Pro/Engineer, dated Dec. 10, 2001, (41 pgs) www.ptc.com/products/proe/index.htm.

* cited by examiner

*Primary Examiner* — Ishrat I Sherali
(74) *Attorney, Agent, or Firm* — Patterson & Sheridan LLP (57) ABSTRACT

A method and apparatus for establishing relationships between attributes of objects is provided. According to one aspect, a set of first user input data that selects a first attribute that is associated with a first object is received. A set of second user input data that selects a second attribute that is associated with a second object is also received. A first set of data that indicates how changes to a value associated with the first attribute are to affect a value associated with the second attribute is then stored.

20 Claims, 7 Drawing Sheets

PARAMETER WIRING

CLAIM OF PRIORITY

This application claims priority from prior U.S. Provisional Patent Application Ser. No. 60/291,947, filed on May 18, 2001, entitled "CONTENT LAYOUT AND DESIGN MECHANISM" naming as inventors Nikolai Sander, Scott Morrison, Britt Miura, Kells Elmquist, John Wainwright, Michael Malone, and Frank Delise; and from prior U.S. Provisional Patent Application Ser. No. 60/293,109, filed on May 22, 2001, entitled "A MECHANISM FOR CONTENT AND DESIGN LAYOUT," naming as inventors Nikolai Sander, Scott Morrison, Britt Miura, Kells Elmquist, John Wainwright, Michael Malone, and Frank Delise, the entire disclosure of which are hereby incorporated by reference in their entirety for all purposes herein.

FIELD OF THE INVENTION

The present invention relates generally to computer graphics, and more specifically, to establishing relationships between attributes of objects in computer graphics applications.

BACKGROUND OF THE INVENTION

Computer generated 3-D modeling and animation enrich a wide range of human experiences that includes everything from captivating audiences at the movie theaters, to gluing garners to their video games, to embarking home buyers on virtual tours of new homes. To generate a 3-D animation, a designer interacts with a 3-D modeling program, such 3D Studio Max™, which is commercially available from Autodesk, Inc., to create a set of animation sequences for importing into a computer graphic application, such as a game engine or computer animated movie. Conventionally, in developing an animation sequence, the designer interacts with the modeling program to generate a set of "short" cycles that can then be used to simulate the various motions of the objects that are to be used within a scene. For example, to simulate a person walking, the designer can create a set of snapshot images that depict a single cycle of the person walking ("walk cycle"). The walk cycle can then be repeated multiple times to generate an animation sequence that simulates the person walking.

In general, to facilitate the simulation of a complex animation sequence a designer is required to generate numerous short cycles in which multiple objects are required to interact and simultaneously move in concert with one another. Conventionally, to generate a short cycle, the designer is required to individually move and/or adjust each object for each snapshot that is to be included within the cycle. For example, to create a cycle that simulates a person speaking, the designer must individually adjust each facial attribute (for example, the eyes, mouth, nose, ears, eyebrows, etc.) to produce the different facial expressions that are required for an animation sequence.

To aid in the creation of short cycles, it is often desirable to establish a relationship between attributes of objects that are to be included within an animation sequence. By establishing these relationships, the designer can be guaranteed that certain objects are correctly synchronized with each other, thus allowing the designer to create a more realistic animation sequence while reducing the amount effort and time that is required to generate the sequence. For example, to create an animation sequence that simulates a person speaking, certain facial attributes (for example, the eyes, mouth, nose, ears, eyebrows, etc.) may be linked to a slider and/or dial ("manipulator"). Thereafter, by simply adjusting the position of the manipulator, the designer can cause the facial attributes to simultaneously move in concert so as to provide both realistic and repeatable facial expressions.

However, a drawback with conventional modeling programs is the values that are associated with the various object attributes are not typically exposed to the animation designer. Thus, in order to establish a relationship between multiple object attributes, a technical director is required to generate program code defines the desired relationships and/or links for the object attributes.

Based on the foregoing, there is a clear need for a mechanism that allows relationships to be easily established between multiple object attributes for aiding in the generation of animation sequences.

SUMMARY OF THE INVENTION

A method and apparatus for establishing relationships between attributes of objects is provided. According to one aspect, a set of first user input data that selects a first attribute that is associated with a first object is received. A set of second user input data that selects a second attribute that is associated with a second object is also received. A first set of data that indicates how changes to a value associated with the first attribute are to affect a value associated with the second attribute is then stored.

According to another aspect, a first set of user input data is received that selects a first object that is displayed within a scene. Based on the first set of user input data, a first set of one or more attributes that are associated with the first object is determined. In addition, a second set of user input data that selects a second object that is displayed within the scene is also received. Based on the second set of user input data, a second set of one or more attributes that are associated with the second object is determined. A third set of user input data is received that selects, from the first set of one or more attributes, a first attribute that is associated with the first object and a fourth set of user input data is received that selects, from the second set of one or more attributes, a second attribute that is associated with the second object. In addition, a fifth set of user input data is received that indicates a control direction for establishing a dependency relationship between the first attribute of the first object and the second attribute of the second object. Dependency relationship data is then stored in memory that defines the dependency relationship that is to be established between the first attribute of the first object and the second attribute of the second object.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A parameter wiring mechanism is provided for establishing relationships between the attributes of objects. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

A gesture-based parameter wiring mechanism is provided for establishing relationships between the attributes of objects. In one embodiment, the parameter wiring mechanism provides a user interface that allows an individual to establish relationships between the values of multiple object attributes. In certain embodiments, the established relationships provide a mechanism for synchronizing the values of multiple object attributes based on a set of user-definable rules and/or constraints. For example, using the parameter wiring mechanism, a user can select an attribute_X of an object_1 and an attribute_Y of an object_2. The user can then define a specific relationship that is to be maintained for the values of attribute_X and attribute_Y (for example, the value of attribute_X to equal twice the value of attribute_Y). As part of defining the relationship, the user may also select a "control direction" that specifies a relationship direction (for example, either unidirectional or bi-directional) that further constrains how the relationship is to be applied to the attribute values. Thereafter, the parameter wiring mechanism automatically updates the values of attribute_X and attribute_Y based on the established relationship. In certain embodiments, in defining bi-directional relationships, separate individual rules and/or constraints can be specified for each control direction, thus allowing either attribute to be adjusted by the user as needed with the other attribute updating automatically according to its specific rule.

Establishing Relationships Between Attributes of Multiple Objects

Figure 1:
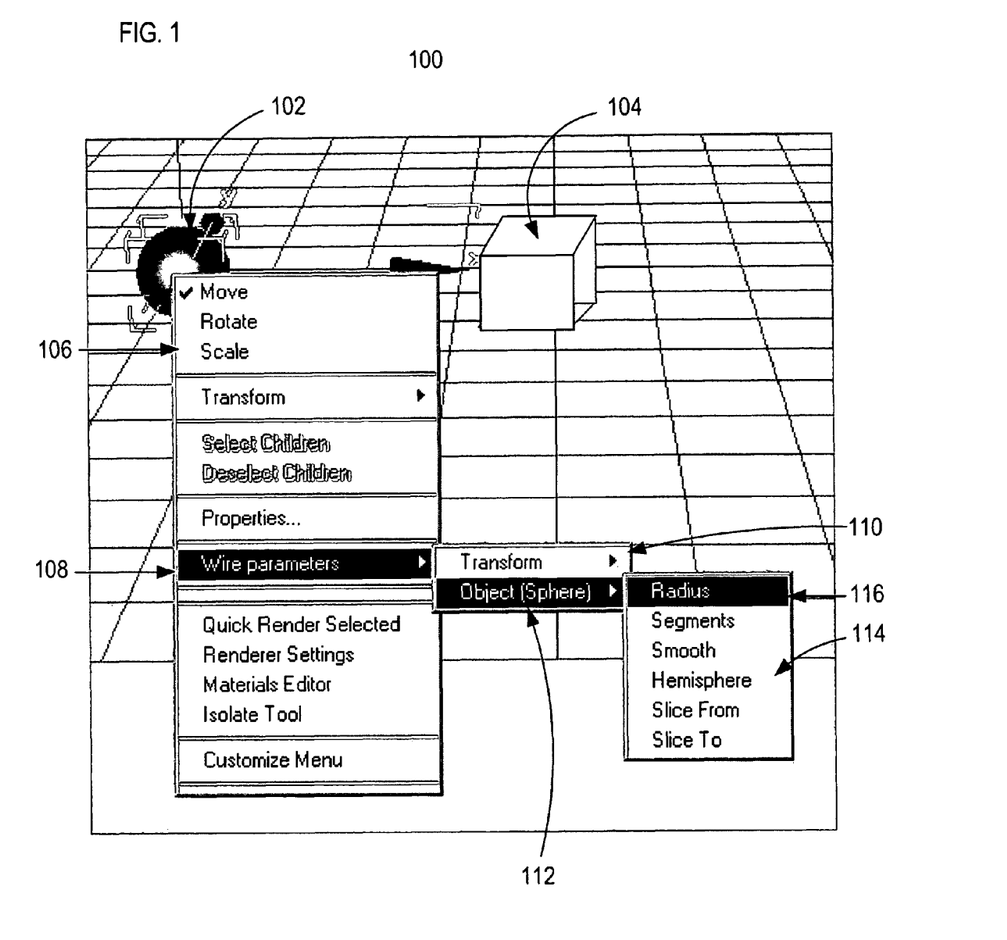
FIG. 1 illustrates an example of a user interface window in which certain embodiments of the invention may be used.

FIG. 1 illustrates an example of a user interface window 100 in which certain embodiments of the invention may be used. In this example, a sphere object 102 and a box object 104 have been created and inserted into user interface window 100. In one embodiment, to establish a relationship between attributes of the two objects (sphere object 102 and box object 104), the user interacts with user interface window 100 to select one of the objects. A variety of techniques may be used to select an object within user interface window 100 as embodiments of the invention are not limited to any specific selection technique. For example, using an input device, such as a mouse or trackball, the user may select a particular object within user interface window 100, possibly by "right-clicking" on the particular object.

For explanation purposes, it shall be assumed that the user has interacted with the input device to select sphere object 102. In response to selecting sphere object 102, the user is presented with an option window 106 that allows the user to, among other things, select a wire parameter option 108 for establishing a relationship with an attribute of the selected object (sphere object 102). In response to selecting the wire parameter option 108, the user is presented with one or more attribute selection menus. The attribute selection menus allow the user to select the particular attributes of the objects that are be wired together. In certain embodiments, the original object that has been selected may have sub-objects with selectable parameters, which in-turn may include its own sub-objects, and so on. In certain embodiments, multiple windows having multiple levels of selectable attributes are presented to the user to enable the selectable wiring of object attributes.

In this example, in response to selecting the wire parameter option 108, the user is presented with a Sub-menu 110 which includes a set of "Transform" and "Object (sphere)" options. As further depicted, in response to selecting object attribute option 112, an attribute option menu 114 is presented to the user within user interface window 100. In certain embodiments, the content of attribute option menu 114 includes a set of "wireable" attributes that are specific to the selected object (in this example, sphere object 102). In one embodiment, attribute option menu 114 is dynamically generated based on the current attributes that are associated with the selected object.

Figure 2:
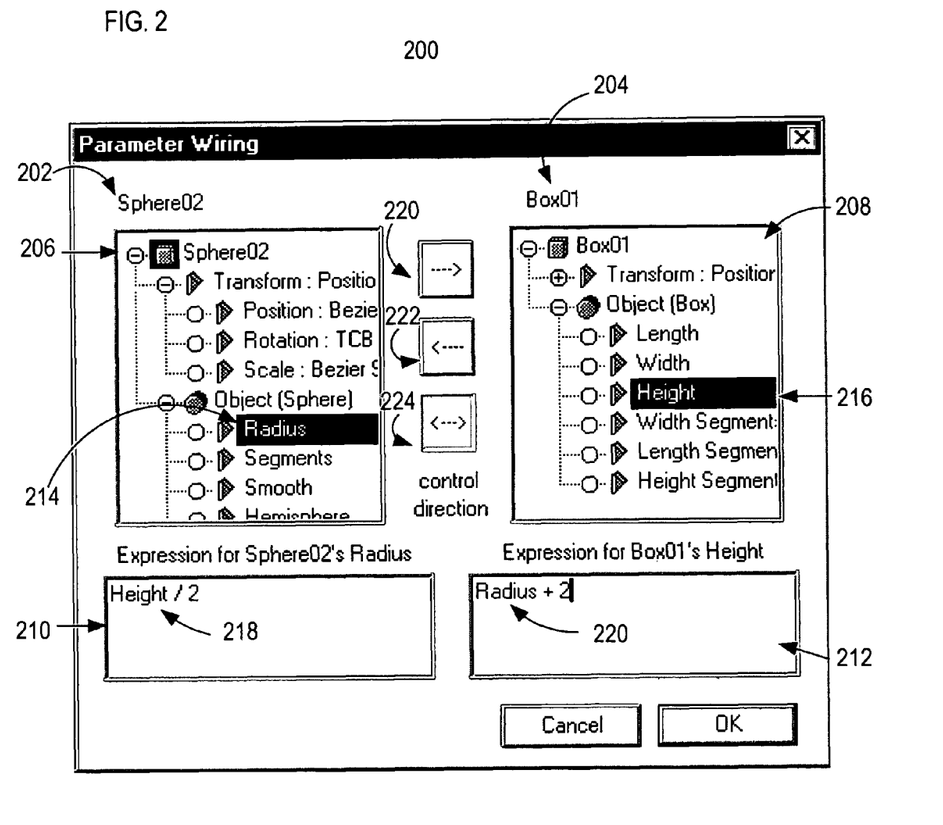
FIG. 2 illustrates an example of a parameter wiring window that may be used to define a set of rules that is to be maintained between a group of object attributes.

As depicted in this example, the user has selected radius attribute option 116 for establishing a relationship with another object attribute. For explanation purposes, it is assumed that after selecting radius attribute option 116, the user has performed a sequence of steps similar to those described for sphere, object 102 in order to select a "height" attribute option that is associated with box object 104. In certain embodiments, in response to selecting the height and radius attribute options, the user is presented with a parameter wiring window 200 as illustrated in FIG. 2.

In this example, parameter wiring window 200 includes a set of object identification labels 202 and 204, a set of object information windows 206 and 208, a set of relation expression windows 210 and 212, and a set of control direction options 220, 222 and 224. Object identification labels 202 and 204 respectively identify sphere object 102 as a first selected object and box object as a second selected object. Object information window 206 identifies radius attribute 214 as the attribute that was selected by the user for sphere object 102. Similarly, object information window 208 identifies height attribute 216 as the attribute that was selected by the user for box object 104.

Relation expression windows 210 and 212 provide an interface that allows the user to specify a set of expressions for establishing a specific relationship that is to be maintained between the values of radius attribute 214 and height attribute 216. In this example, the user has selected an expression 218 that constrains the value of radius attribute 214 to the height of box object 104 divided by two (height/2). As further depicted, the user has selected an expression 220 that constrains the value of height attribute 216 to the radius of sphere object 102 plus two (radius+2). As is explained in greater detail below, expressions 218 and 220 are provided for explanation purposes only as embodiments of the invention are not limited to any particular form and/or type of expression.

Control direction options 220, 222 and 224 allow the user to select a specific control direction for enforcing the constraints that are defined by the expressions that are entered in relation expression windows 210 and 212. For example, by selecting control direction option 220, the user can enforce a unidirectional constraint such that whenever the value of radius attribute 214 of sphere object 102 is modified, the value of height attribute 216 of box object 104 is automatically updated based on the expression 220 as defined in relation expression windows 212 (radius+2). Alternatively, by selecting control direction option 222, the user can enforce a unidirectional constraint such that whenever the value of height attribute 216 of box object 104 is modified, the value of radius attribute 214 of sphere object 102 is automatically updated based on the expression 218 as defined in relation expression windows 210.

For example, based on expressions 218 and 220, if the user selects control direction option 220 and then modifies the radius of sphere object to equal "10", the height of box object 104 is automatically updated to equal the value "12" (10+2). However, because control direction option 220 is unidirectional such that the value of the height attribute 216 is constrained by the value of the radius attribute 214, but not visa-versa, if the user subsequently modifies the height of box object 104 to equal "8", the radius of sphere object is not affected (i.e., is not updated to equal "4" (8/2)), but instead remains equal "10". In certain embodiments, the parameter wiring mechanism includes one or more selectable options that can be used to prevent a controlled attribute from being directly changed in order to preserve the constraint rule at all times. For example, the height of box object 104 in the previous example would not be changeable directly by the user, but only indirectly by changing the radius of sphere object 102.

Alternatively, if the user selects control direction option 222 and then modifies the height of box object 104 to equal "10", the radius of sphere object is automatically updated to equal the value "5" (10/2). However in this example, because control direction option 222 is unidirectional such that the value of the radius attribute 214 is constrained by the value of the height attribute 216, but not visa-versa, if the user subsequently modifies the radius of sphere object to equal "8", the height of box object 104 is not affected (i.e., is not updated to equal "10" (8+2)), but instead remains equal "10".

In certain embodiments, by selecting control direction option 224, the user can enforce a bi-directional constraint such that whenever the user modifies the value of either radius attribute 214 or height attribute 216, the value of the other attribute is automatically updated based on the defined expression. For example, by selecting control direction option 224, the user can enforce a bi-directional constraint such that whenever the user modifies the value of radius attribute 214, the value of height attribute 216 is automatically updated based on the defined expression 220 as defined in relation expression windows 212. Similarly, if after selecting control direction option 224 the user modifies the value of height attribute 216, the value of radius attribute 214 is automatically updated based on the expression 218 as defined in relation expression windows 210. Generally, the controlling rules for each direction in a bi-directional constraint will be inverses of one another, in order to establish a stable and sensible wiring. As described in a later section, in certain embodiments, the parameter wiring mechanism may enforce this inverse requirement or assist in the derivation of an inverse.

Establishing Relationships Between Attributes of a Single Objects

Figure 3A:
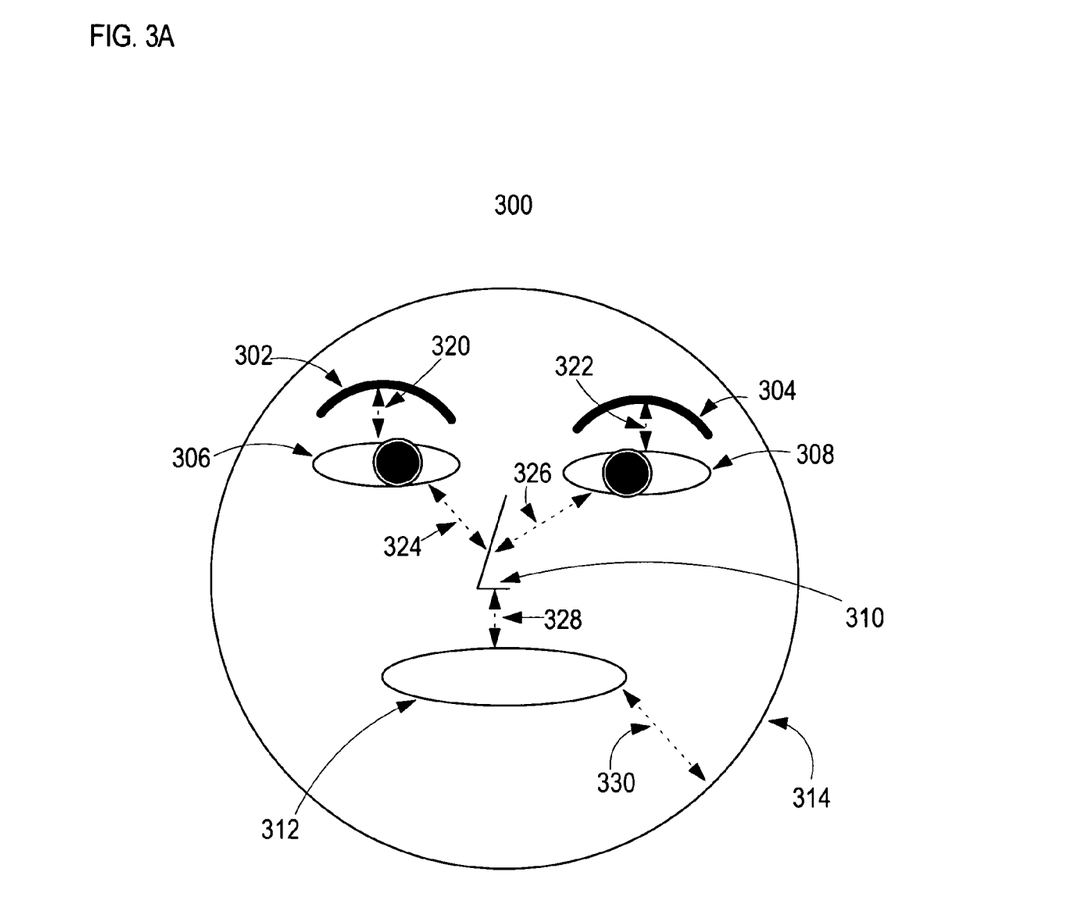
FIG. 3A illustrates a face object that includes a plurality of attributes for which a set of relationships may be established.

In addition to establishing relationships between attributes of different objects, in certain embodiments, the parameter wiring mechanism provides a user interface that allows a user to establish specific relationships between different attributes of a single object. FIG. 3A illustrates a face object 300 that includes a plurality of attributes for which relationships may be established between one another. In this example, face object 300 includes eyebrow attributes 302,304, eye attributes 306,308, a nose attribute 310, a mouth attribute 312 and a face size attribute 314. As further illustrated, a set of relationships (depicted by lines 320-330) have been established between the various face attributes. For example, relationship 330 establishes a constraint that synchronizes the size of mouth 312 with face size attribute 314. Thus, assuming that relationship 330 is a bi-directional relationship, in response to modifying the value of face size attribute 314 (for example, enlarging the size of face object 300), the value of mouth attribute 312 is automatically updated based on the expression that was previously defined for this relationship. Likewise, in response to modifying the value of mouth attribute 312 (for example, reducing the size of the mouth), the value of face size attribute 314 is automatically updated based on the expression that was previously defined for this relationship.

Associating Handles with Object Attributes

Figure 3B:
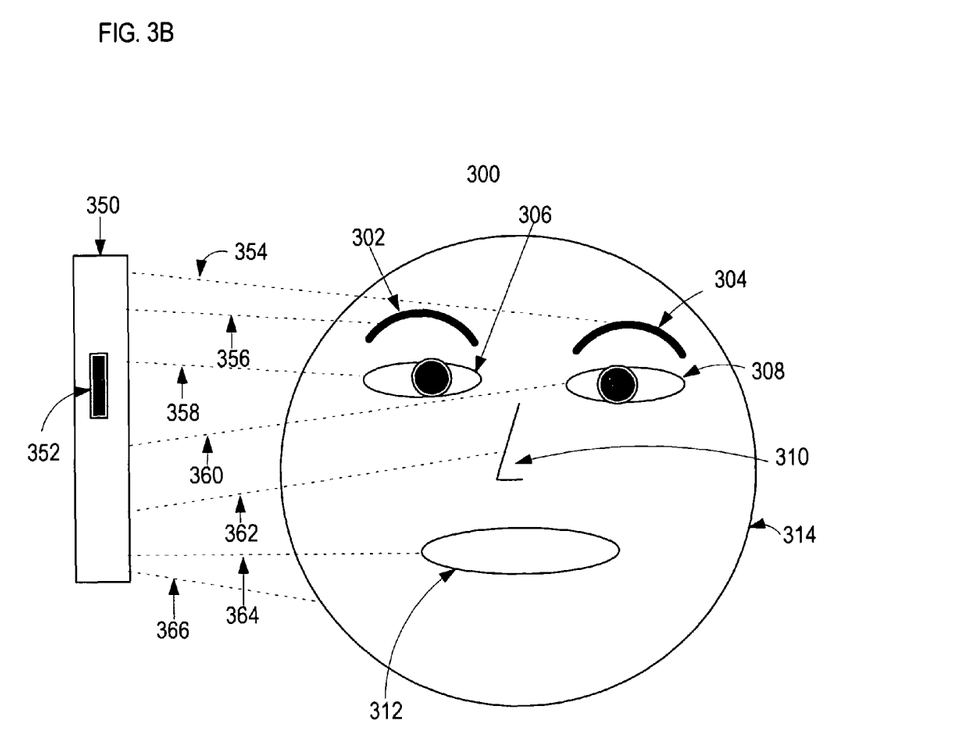
FIG. 3B the creation and use of a manipulator object for manipulating the attribute values of one or more object.

In certain embodiments, the parameter wiring mechanism provides a user interface that allows a user to create a "manipulator" object (for example, a slider or scroller object) and to establish one or more relationships between the manipulator and one or more attributes of one or more objects. For example, as depicted in FIG. 3B, by interacting with the parameter wiring mechanism, a user is provided with a user interface that allows the user create a manipulator object 350 that can be used to manipulate the attribute values of face object 300. In this example, the user has interacted with the user interface to define a set of relationships (354, 356, 358, 360, 362, 364, 366) between a location attribute of a slider bar 352 and various attributes of face object 300. By establishing the relationships (354, 356, 358, 360, 362, 364, 366), the user can simultaneously control and/or manipulate the values of eyebrow attributes 302,304, eye attributes 306, 308, nose attribute 310, mouth attribute 312 and face size attribute 314.

In certain embodiments, the user may establish the relationships (354, 356, 358, 360, 362, 364, 366) as either unidirectional or bi-directional relationships. For example, relationships 354 and 356 may be established as unidirectional relationships whereby the manipulation of the location attribute of slider bar 352 (for example, the user sliding slide bar 352 up or down) causes the values of eyebrow attributes 302 and 304 to be updated based on the defined relationship expressions, whereas the manipulation of eyebrow attributes 302 and 304 (either directly by the user or through an alternative relationship), does not affect the value of the location attribute of slider bar 352 within manipulator object 350.

Alternatively, if the user establishes a bi-directional relationship between an attribute of face object 300 and the location attribute of slider attribute 352, in response to the attribute being manipulated, the value of the location attribute of slider bar 352 is automatically updated based on the relationship expression that has been defined. For example, if relationships 354 and 356 are established as bi-directional relationships, the manipulation of the location attribute of slider attribute 352 causes the values of eyebrow attributes 302 and 304 to be updated based on the defined relationship expressions. Likewise, the manipulation of eyebrow attributes 302 and 304 causes the value of the location attribute of slider bar 352 to be modified.

In certain embodiments, by defining one or more bi-directional relationships, a cascading effect can be established whereby the manipulation of a first attribute causes the automatic updating of a second attribute, which in-turn causes the automatic updating of a third attribute, etc. For example, assume that relationship 362 is a bi-directional relationship between and the location attribute of slider bar 352 and nose attribute 310. Further assume that relationship 364 is a uni-directional relationship whereby the value of mouth attribute 312 is dependent on the value of the location attribute of slider bar 352, but not visa-versa. In this situation, in response to the user manipulating the nose attribute 310, the value of the location attribute of slider bar 352 is automatically updated based on the constraint and/or relationship that has been established between the location attribute of slider bar 352 and nose attribute 310. In addition, in response to the value of the location attribute of slider bar 352 being updated, the value of mouth attribute 312 is automatically updated based on the constraint and/or relationship that has been established between the location attribute of slider bar 352 and mouth attribute 312.

In certain embodiments, the system will detect and prevent attempts to establish circular chains of wired parameters, which could otherwise result in unstable feedback situations.

Establishing Rules for Synchronizing Attribute Values

As previously described with regards to FIG. 2, in certain embodiments the user is allowed to define a specific rule that characterizes the relationship that is to be maintained between the values of the selected attributes. In FIG. 2, relation expression windows 210 and 212 respectively include expressions 218 and 220 that specify a set of mathematical expressions for establishing a specific relationship that is to be maintained between the values of radius attribute 214 and height attribute 216.

In certain embodiments, the parameter wiring mechanism includes an interpreter that interprets the expressions that are entered into the relation expression windows 210 and 212. In one embodiment, the interpreter verifies that the expressions are inverses of one another by automatically substituting a set of values into the expressions and verifying that the results indicate that the expressions are inverses of one another. If the interpreter determines that the expressions are not inverses, the user may be notified/warned that the expressions are not inverses.

In certain embodiments, in response to a user entering an expression within a relation expression window (for example, relation expression window 210), the parameter wiring mechanism automatically determines an inverse expression based on the selected attributes and enters the inverse expression within the other relation expression window (for example, relation expression window 212). For example, in response to the user entering expression 218 in relation expression windows 210 ("Height/2"), the parameter wiring mechanism automatically determines the inverse expression based on the selected attributes (Radius & Height) to be "Radius*2" and enters the expression into relation expression windows 212.

Although examples have been illustrated using relatively simple relationship expressions, embodiments of the invention are not limited to any particular type or form of rule or expression. For example, in certain embodiments, a relationship expression may include a function call, a program, a batch file, a script or various other programmable logic that can be used to calculate and/or resolve a value for a selected attribute. For example, instead of entering expression 218 in relation expression windows 210, the user may instead enter the name of a function or the name of a script, written in a particular scripting or programming language, which is then used to resolve the value of the selected attribute.

In one embodiment, the relationship expression and/or rule is not required to include both, or even any of the selected attributes. For example, a relationship expression and/or rule may include any number and/or any combination of variables that can be resolved by the parameter wiring mechanism. For example, instead of selecting expressions 218 (height/2) and 220 (radius+2), the user may instead define expression 218 as "Length−2" (the Length attribute depicted in object information windows 208 of FIG. 2) and expression 220 as "Segments*3" (the Segments attribute depicted in object information windows 208 of FIG. 2).

Alternatively, the user may define expressions 218 and 220 using the values of one or more attributes that are associated with other objects (i.e. objects other than sphere 102 and box 104) that are included within a particular scene. For example, assuming that the user has also created a pyramid object in addition to sphere 102 and Box 104 in FIG. 1, instead of selecting expressions 218 (height/2) and 220 (radius+2), the user may instead define expression 218 as "radius*PyramidBaseArea" (the radius value of sphere 102 times the value of an Area attribute that is associated with the Base of the Pyramid) and expression 220 as "(PyramidHeight*2)/height" (the value of the height attribute associated with the Pyramid times "2", divided by the height of box 104).

In certain embodiments, the parameter wiring mechanism includes an optimizer that employs a set of one or more "hard-coded" transfer expressions to define how the value of one parameter is to be transferred into the value of another. In one embodiment, the hard-coded transfer expressions are hard-wired into low-level machine code which allow certain attribute relationships to be calculated at a much greater speed.

For example, by creating a set of predefined hard-coded transfer expressions (for example, divide by a particular number, multiply by a particular number, etc.) the parameter wiring mechanism may be able to compile certain expressions into executable machine code. Thus, instead of having to interpret each of the rules, the parameter wiring mechanism may execute a set of machine code, thus increasing the performance of the system.

In certain embodiments, the parameter wiring mechanism may provide a selection of built-in relationships that are useful for common animation tasks. The selection of the built-in relationships may be provided through a variety of buttons, menus, checkboxes or various other selection devices.

Chains of Attribute Relationships

Figure 4:
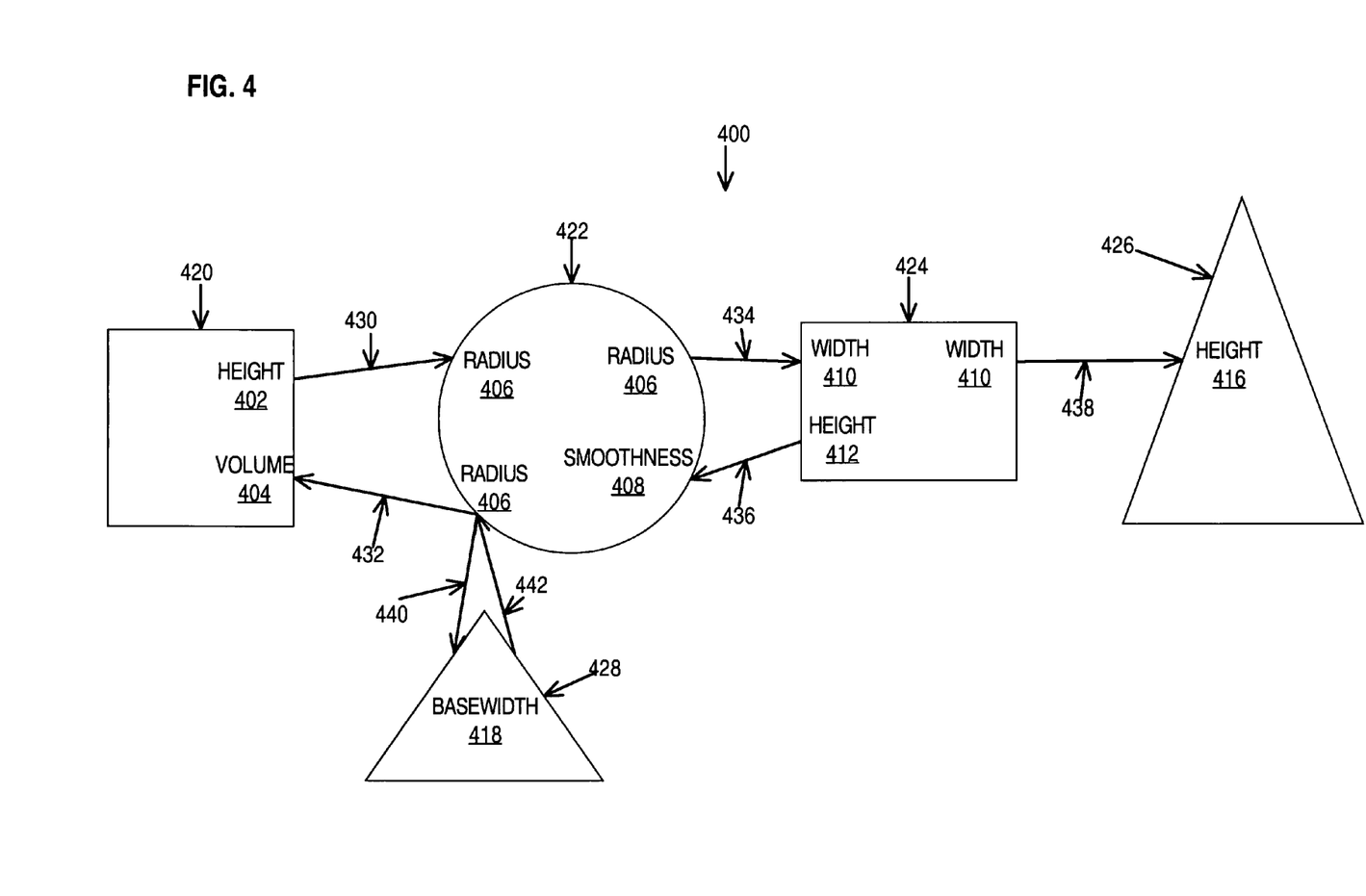
FIG. 4 illustrates an example relationship chain that may be established in accordance with certain embodiments of the invention.

The parameter wiring mechanism allows a user to define a chain of relationships between the attributes of a plurality of objects. By establishing a chain of attribute relationships, the user can quickly modify, update and/or control the selected attribute characteristics of the objects within the chain. FIG. 4 illustrates an example relationship chain 400 that may be established in accordance with certain embodiments of the invention. As depicted, a plurality of objects (box 420, sphere 422, rectangle 424, pyramid 426 and pyramid 428) has created for use in a particular application. As further illustrated, the user has interacted with the parameter wiring mechanism to establish a chain of relationships between a set of attributes that are associated with the plurality of objects. For example, by interacting with a user interface (for example, user interface window 100 of FIG. 1), the user has established a relationship 430 between the value of the height attribute 402 of box 420 and the value of the radius attribute 406 of sphere 422. Further, by interacting with a parameter wiring window (for example, parameter wiring window 200) the user can define a specific rule that constrains the value of radius attribute 406 based on the current value of height attribute 402.

As illustrated in FIG. 4, relationship chain 400 includes a set of relationships (relationships 430, 434, 438 and 440) whereby in response to the user modifying the value of height attribute 402 of box 420, the parameter wiring mechanism automatically updates the value of radius attribute 406 of sphere 422 based on the defined rule that is associated with relationship 430. Then, in response to the value of radius attribute 406 of sphere 422 being updated, the parameter wiring mechanism automatically updates both the value of width attribute 410 of rectangle 424 based on the defined rule for relationship 434 and the value of basewidth attribute 418 of pyramid 428 based on the defined rule for relationship 440. Then Lastly, in response to the value of width attribute 410 of rectangle 424 being updated, the parameter wiring mechanism automatically updates the value of height attribute 416 of pyramid 426. Thus, by modifying the height attribute of box 420, the user can affect a variety of selected attributes within a plurality of objects based on the set of relationships and rules that the user has previously established.

In a similar manner, by directly modifying the value of radius 406 of sphere 422, the user can automatically modify and/or adjust the values of volume attribute 404 of box 420, width attribute 410 of rectangle 424, height attribute 416 of pyramid 426 and basewidth attribute 418 of pyramid 428, based on relationships 432, 434, 438 and 440, respectively.

However, as further illustrated, because a unidirectional relationship exists between rectangle 424 and pyramid 426, the updating of an attribute value within pyramid 426 does not affect the values of attributes that are associated with objects 420, 422, 424 or 428.

Figure 5:
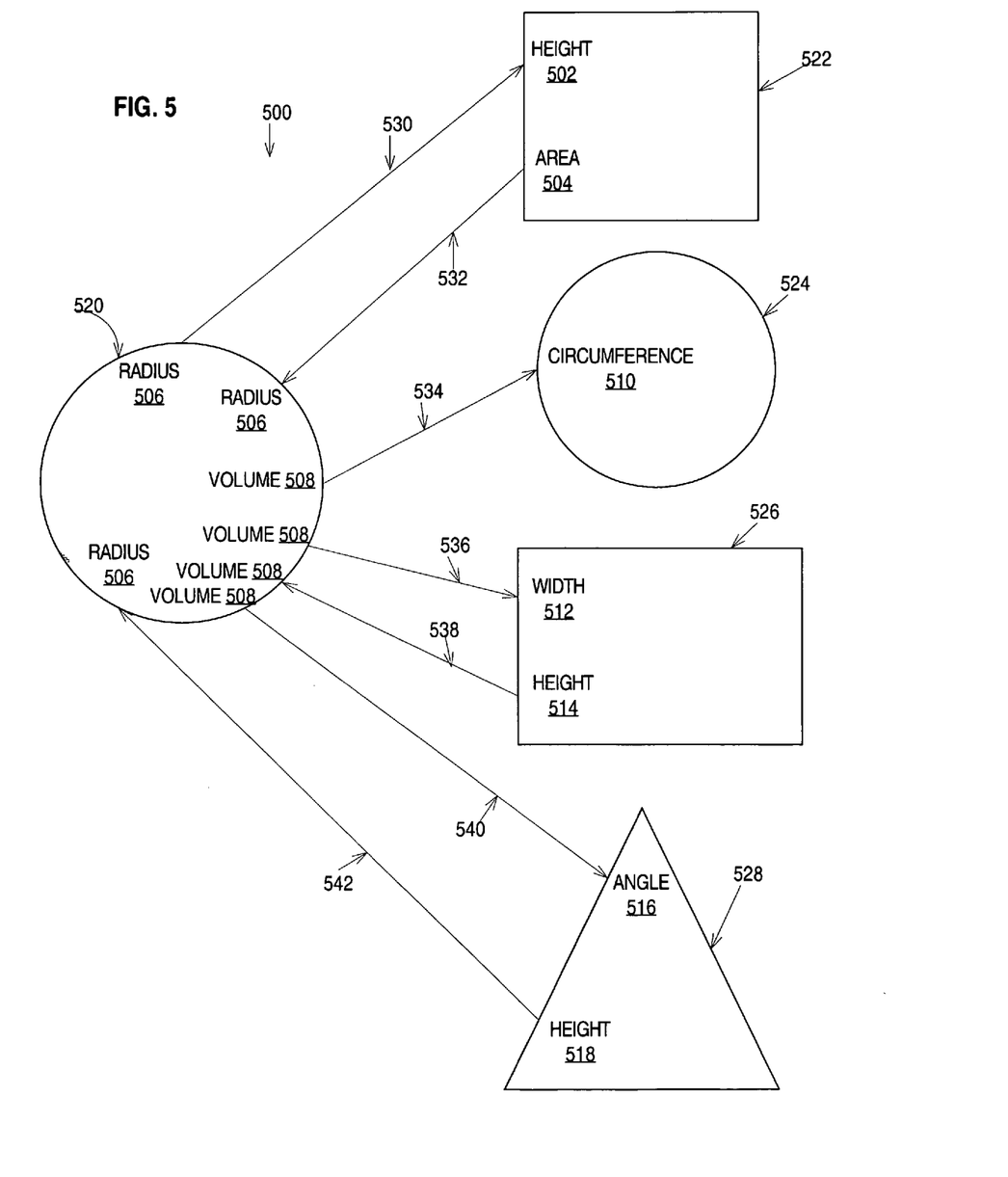
FIG. 5 illustrates another example of a relationship chain in which the relationships are configured in a fan like relationship format.

Although FIG. 4 provides an example of a specific relationship chain configuration, embodiments of the invention are not limited to any particular relationship configuration. For example, FIG. 5 illustrates another example of a relationship chain 500 in which the relationships are configured in a "Fan" like and/or "hub" like relationship format. In this example, a sphere object 520 includes or is associated with one or more direct relationships to one or more attributes of a plurality of objects (box 522, sphere 524, rectangle 526 and triangle 528), each relationship of which can have a separate controlling rule or expression. Thus, based on the defined relationships, by adjusting the value of either the radius attribute 506 or the volume attribute 508, the user can cause selected attributes of objects 522, 524, 526 and 528 to adjust in concert with each other.

In certain embodiments, each independent object is associated with a list of pointers that point to each of the dependent objects. Then, in response to a change being made to an independent object, the independent object transmits a notification to each of the dependent object describes the change that was made. In response to the notification, the dependent object updates the value of its attributes based on the established relationships and notifies each of its dependent objects of the change that it made, thus allowing the effect of a change to ripple through the relationship chain.

Constraint Dependency Relationships

Various methods may be used to enforce and/or manage the relationships that are defined by a user for a particular set of attributes. In certain embodiments, the parameter wiring mechanism utilizes a hierarchy of dependency networks that define the dependency rules that have been defined through the user interface. In one embodiment, a dependency network is established for each attribute that controls the value of one or more other object attribute. For example, TABLE 600 includes a set of dependency networks that may be established for relationship chain 400 in FIG. 4.

TABLE 600

| DEPENDENCY NETWORKS | |
| --- | --- |
| ATTRIBUTE | DEPENDENCIES |
| HEIGHT 402 | RADIUS 406 |
| RADIUS 406 | WIDTH 410, VOLUME 404, BASEWIDTH 418 |
| WIDTH 410 | HEIGHT 416 |
| BASEWIDTH 418 | RADIUS 406 |
| HEIGHT 412 | SMOOTHNESS 408 |

In certain embodiments, the parameter wiring mechanism verifies that the user has not established any illegal relationships and that the dependency networks do not include any closed loops.

Additional User Interfaces

Various different user-interfaces have been depicted for illustrating certain features of the parameter wiring mechanism. However, embodiments of the invention are not limited to the specific set of user-interfaces that are illustrated within the figures. For example, in certain embodiments, the parameter wiring mechanism provides a set of user-interface devices that assist the user in navigating and managing existing parameter-wiring networks. For example, in certain embodiments, the parameter wiring mechanism provides a graphical representation that includes icons representing objects, lines representing parameter wires, and text describing the attributes and the controlling expressions. In certain embodiments, this graphical representation may be interactive, allowing the user to adjust the network by creating or dragging icons, wiring lines and directly entering controlling expressions for each of the relationships. In addition, the parameter wiring mechanism may provide a graphical representation in the form of a pair of object/attribute hierarchy nested lists, thus allowing the user to select an attribute or object in one list and providing a set of buttons or menus to see and edit and step through connected attributes or objects in the other list.

Hardware Overview

Figure 6:
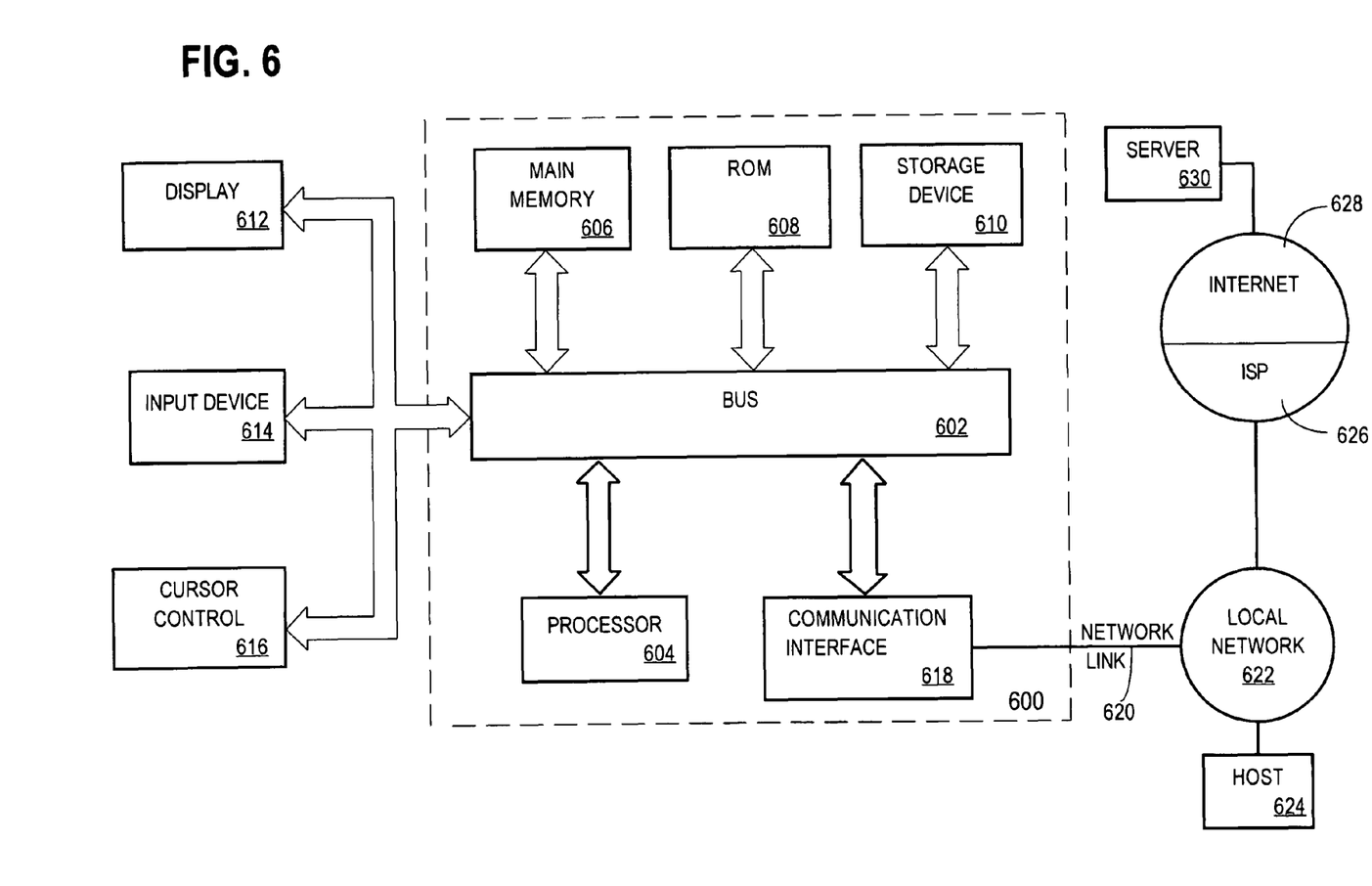
FIG. 6 is a block diagram of a computer system with which an embodiment may be carried out.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM)

or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for establishing relationships between the attributes of objects. According to one embodiment of the invention, a mechanism for establishing relationships between the attributes is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for establishing relationships between the attributes of objects as described herein.

The received code may be executed by processor 604 as it is received, and/or stored in storage device 610, or other non-volatile storage for later execution. In this manner, computer system 600 may obtain application code in the form of a carrier wave.

Alternatives, Extensions

Attribute examples, number of verticies, smoothness, brightness, etc.

A parameter wiring mechanism is disclosed that provides a user interface for establishing relationships between the attributes of one or more objects which, in certain circumstances, can significantly increase the speed of animation development. As described, the parameter wiring mechanism allows the user readily establish relationships and rules between a plurality of attributes that are associated with objects within a scene. In one aspect, once a set of relationships a set of relationships are established, the user is no longer required to remember which object is the "controlling object," but instead can modify any object that has been included within the established relationship.

In describing certain embodiments of the invention, several drawing figures have been used for explanation purposes. However, the invention is not limited to any particular context as shown in drawing figures, and the scope of the invention includes other contexts and applications in which the mechanisms and processes described herein is available to other mechanisms, methods, programs, and processes. For example, although examples have illustrated certain types of attributes in which relationship have been established, embodiments of the invention are not limited to any particular type of attribute and/or any particular type of object. For example, a user may interact with the parameter wiring mechanism to establish a relationship between a "brightness attribute" that is associated with a light object and smoothness attribute that is associated with a spherical mesh object. Thus, the specification and drawings are, accordingly, to be regarded in an illustrative rather than a restrictive sense. Therefore, the invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A system for selectively wiring graphics object attributes, the system comprising:
   means for enabling a user to specify a first mathematical expression for a first graphics object attribute associated with a first graphics object; and
   means for enabling the user to specify a second mathematical expression for a second graphics object attribute associated with a second graphics object,
   wherein, based on the first mathematical expression and the second mathematical expression, the second graphics object attribute is directly responsive to the first graphics object attribute such that a change in the first graphics object attribute causes a change in the second graphics object attribute.

2. The system of claim 1, wherein each of said means for enabling the user to specify the first mathematical expression and said means for enabling the user to specify the second mathematical expression comprise a graphical user interface including an object information window for selecting the first graphics object attribute and a relation expression window for specifying the first mathematical expression.

3. The system of claim 1, wherein each of said means for enabling the user to specify the first mathematical expression and said means for enabling the user to specify the second mathematical expression comprise a graphical user interface including a first object information window for selecting the first graphics object attribute, a second object information window for selecting the second graphics object attribute, a first relation expression window for specifying the first mathematical expression and a second relation expression window for specifying the second mathematical expression.

4. The system of claim 1, further comprising means for enabling the user to define a bi-directional constraint that allows a change in the first graphics object attribute to cause a change in the second graphics object attribute based on the first mathematical expression and the second mathematical expression and allows a change in the second graphics object attribute to cause a change in the first graphics object attribute based on the first mathematical expression and the second mathematical expression.

5. The system of claim 4, wherein means for enabling the user to define a bi-directional constraint comprises a graphical user interface including a bi-directional control option.

6. The system of claim 1, further comprising a means for enabling the user to control the value of the first graphics object attribute.

7. The system of claim 6, wherein means for enabling the user to control the value of the first graphics object attribute comprises a graphical user interface including a slider.

8. The system of claim 6, wherein means for enabling the user to control the value of the first graphics object attribute comprises a graphical user interface including a scroll object.

9. The system of claim 1, further comprising means for interpreting the first mathematical expression and the second mathematical expression.

10. The system of claim 9, wherein means for interpreting is configured to verify that the first mathematical expression is an inverse of the second mathematical expression.

11. The system of claim 9, wherein the first mathematical expression comprises a function call, a program, a batch file or a script.

12. The system of claim 1, further comprising means for optimizing computations underlying the first mathematical expression and the second mathematical expression.

13. The system of claim 12, wherein means for optimizing is configured to employ a hard-coded transfer expression for performing the computations underlying the first mathematical expression and the second mathematical expression.

14. A method for selectively wiring graphics object attributes, the method comprising:
   enabling a user to specify a first mathematical expression for a first graphics object attribute associated with a graphics object; and
   enabling the user to specify a second mathematical expression for a second graphics object attribute associated with the graphics object,
   wherein, based on the first mathematical expression and the second mathematical expression, the second graphics object attribute is directly responsive to the first graphics object attribute such that a change in the first graphics object attribute causes a change in the second graphics object attribute.

15. The method of claim 14, further comprising enabling the user to define a bi-directional constraint that allows a change in the first graphics object attribute to cause a change in the second graphics object attribute based on the first mathematical expression and the second mathematical expression and allows a change in the second graphics object attribute to cause a change in the first graphics object attribute based on the first mathematical expression and the second mathematical expression.

16. The method of claim 14, further comprising enabling the user to control the value of the first graphics object attribute.

17. The method of claim 14, further comprising interpreting the first mathematical expression and the second mathematical expression.

18. A computer readable medium storing instructions for causing a computer to selectively wire graphics objects by performing the steps of:

enabling a user to specify a first mathematical expression for a first graphics object attribute associated with a first graphics object; and enabling the user to specify a second mathematical expression for a second graphics object attribute associated with a second graphics object, wherein, based on the first mathematical expression and the second mathematical expression, the second graphics object attribute is directly responsive to the first graphics object attribute such that a change in a user supplied value for the first graphics object attribute causes a change in the second graphics object attribute.

19. The computer readable medium of claim 18, further comprising the step of enabling the user to define a bi-directional constraint that allows a change in the first graphics object attribute to cause a change in the second graphics object attribute based on the first mathematical expression and the second mathematical expression and allows a change in the second graphics object attribute to cause a change in the first graphics object attribute based on the first mathematical expression and the second mathematical expression.

20. The computer readable medium of claim 18, further comprising the step of enabling the user to control the value of the first graphics object attribute.

\* \* \* \* \*